United States Patent [19]

Haney et al.

[11] Patent Number: 4,849,272

[45] Date of Patent: Jul. 18, 1989

[54] MAGNETICALLY SECURABLE FENDER COVER APPARATUS

[76] Inventors: Terry Haney; Craig E. Thomas, both of 245 S. Plumer Ave. #3, Tucson, Ariz. 85719

[21] Appl. No.: 730,442

[22] Filed: May 6, 1985

Related U.S. Application Data

[63] Continuation-in-part of Ser. No. 593,586, Mar. 26, 1984, abandoned.

[51] Int. Cl.⁴ .............................................. B32B 3/06
[52] U.S. Cl. .................................... 428/102; 428/100; 428/192; 428/198; 428/900
[58] Field of Search ............... 428/900, 100, 102, 192, 428/198; 296/95 C

[56] References Cited

U.S. PATENT DOCUMENTS 3,665,355  5/1972  Sasaki et al. ......................... 428/900

Primary Examiner—Ellis P. Robinson
Assistant Examiner—P. R. Schwartz
Attorney, Agent, or Firm—H. Gordon Shields

[57] ABSTRACT

Fender cover includes a relatively soft, non-abrasive first layer which is disposed against a fender and an outer cover which is substantially impermiable to grease and other contaminants for protecting a fender while a mechanic works on an engine. The fender cover is held in place on the fender by means of flexible magnetic elements disposed between the two layers.

20 Claims, 1 Drawing Sheet

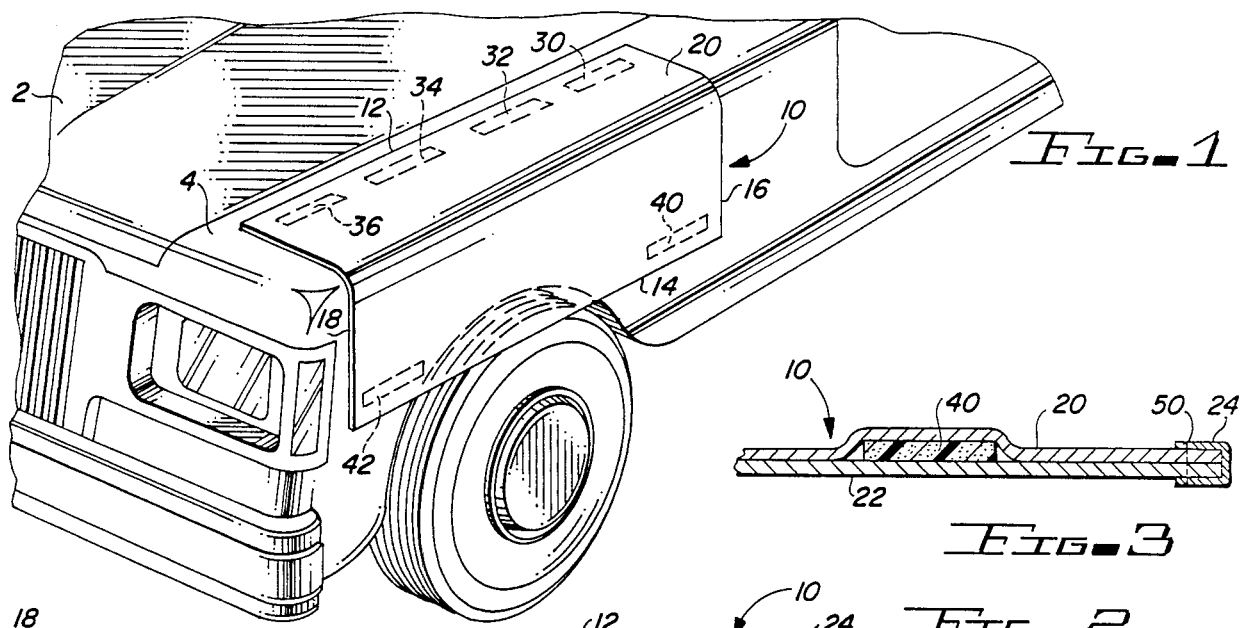
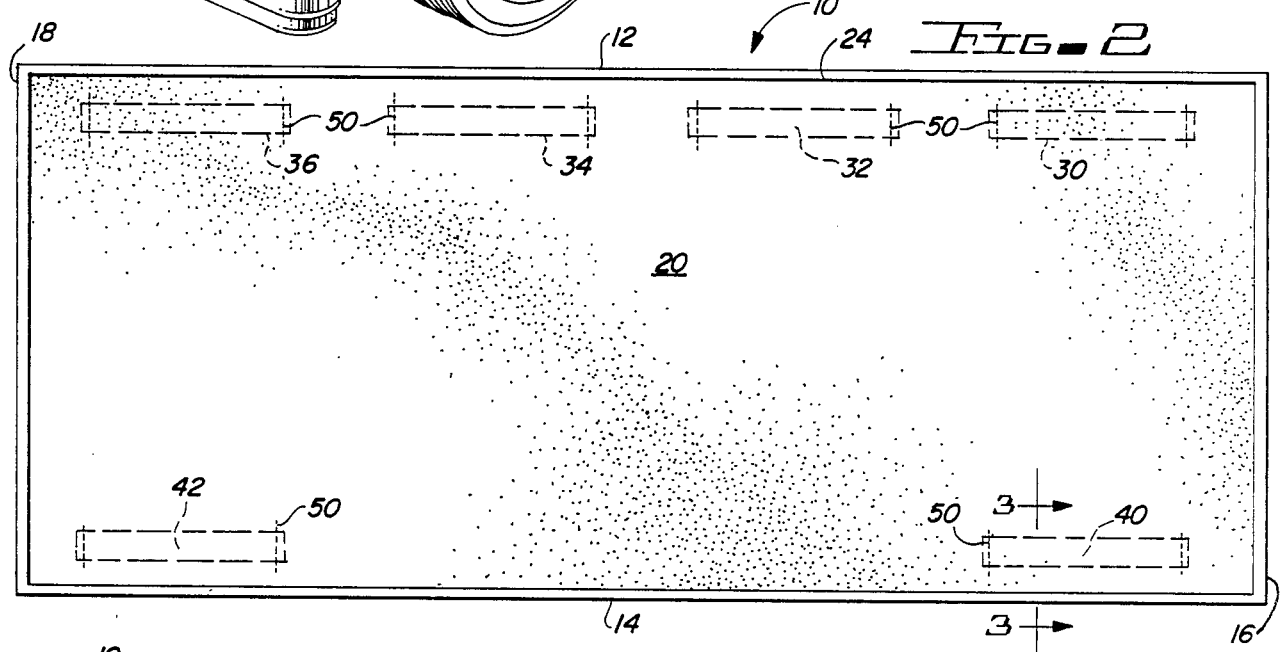
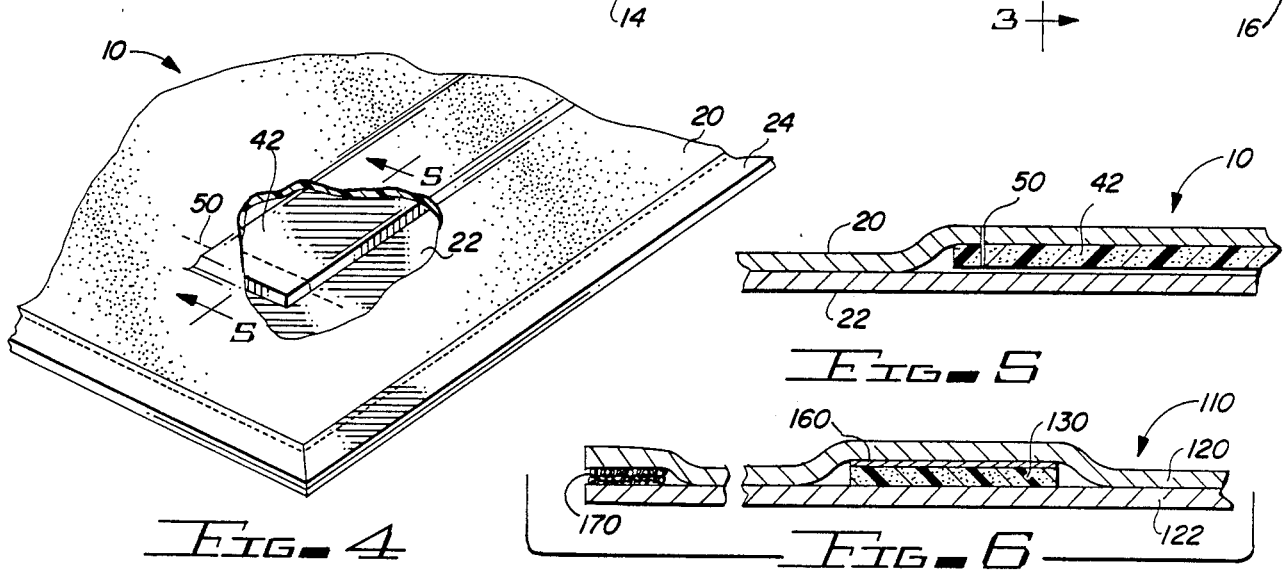

MAGNETICALLY SECURABLE FENDER COVER APPARATUS

CROSS REFERENCE TO RELATED APPLICATION

This application is a continuation-in-part application of copending application Ser. No. 593,586, filed March 26, 1984, now abandoned.

BACKGROUND OF THE INVENTION

1. Field of the Invention:

This invention relates to protective covers, and, more particularly, to protective covers for fenders of automotive vehicles.

2. Description of the Prior Art:

U.S. Pat. No. 2,119,072 discloses an automotive fender cover. Clips are used to secure the cover to the fender of an automobile.

U.S Pat. No. 2,880,015 discloses another type of fender cover. The '015 fender cover utilizes foam rubber on the bottom of the cover to help grip the fender surface. The '015 patent also includes a channel in the center of the cover for holding tools. Experience has shown that the foam rubber deteriorates in time and crumbles, leaving a residue on the vehicle.

U.S. Pat. No. 3,665,355 discloses a protective covering for automobiles and the like which includes magnetic strips embedded within the covering. The apparatus of the '365 patent utilizes two outside layers, with magnetic strips disposed between the outside layers and cushion material is disposed between the magnetic strips to provide a unitary protective and cushioning cover of uniform thickness. There are alternate embodiments shown, and in each embodiment there is material adjacent to the magnetic strips thus providing a cover of equal thickness throughout the cover.

U.S. Pat. No. 3,298,712 discloses another type of fender pad which includes a pocket in the pad. The pocket is closed by a zipper and is adapted to hold tools.

SUMMARY OF THE INVENTION

The invention described and claimed herein comprises a protective cover which includes a layer of relatively soft non-abrasive material, disposed against a metal layer, a relatively impermeable layer disposed on the outside of the cover, and against which a user makes contact, and flexible magnets disposed between layers at discrete locations for securing the cover to sheet metal surfaces of, for example, an automobile fender.

Among the objects of the present invention are the following:

To provide new and useful protective cover apparatus;

To provide new and useful fender cover apparatus including flexible magnets;

To provide new and useful fender cover apparatus having flexible magnetic strips disposed between inner and outer layers of materials;

To provide a new and useful fender cover in which magnetic elements are used to secure the cover to the fender and to hold tools on the cover; and To provide new and useful fender cover apparatus having an inner layer of material and an outer layer of material and flexible magnetic elements secured to the outer layer of material.

BRIEF DESCRIPTION OF THE DRAWING

FIG. 1 is a perspective view of an automotive vehicle showing the apparatus of the present invention in its use environment.

FIG. 2 is a top plan view of the apparatus of the present invention.

FIG. 3 is a view in partial section of a portion of the apparatus of FIG. 2, taken generally along line 3—3 of FIG. 2.

FIG. 4 is a perspective view, partially broken away, of a portion of the apparatus of the present invention.

FIG. 5 is a view in partial section of a portion of the apparatus of FIG. 4, taken generally along line 5—5 of FIG. 4.

FIG. 6 is a view in partial section of an alternate embodiment of the apparatus of the present invention.

DESCRIPTION OF THE PREFERRED EMBODIMENT

FIG. 1 is a perspective view of an automotive vehicle 2 showing a magnetic cover apparatus or article 10 of the present invention disposed on a fender 4 of the automotive vehicle 2. FIG. 2 is a top plan view of the magnetic cover apparatus 10, showing its generally rectangular configuration, and showing in phantom placement of flexible magnetic elements which are used to secure the cover apparatus 10 to metal surfaces, such as fenders of an automotive vehicle. FIG. 3 is a view in partial section of the fender cover apparatus 10 taken generally along line 3—3 of FIG. 2, and disclosing the two layers of the cover 10, with a magnetic element disposed between the two layers. FIG. 5 is a view in partial section taken generally along line 5—5 of FIG. 4. For the following discussion, reference will primarily be made to FIGS. 1, 2, 3, 4, and 5.

The cover apparatus or article 10 is generally of a rectangular configuration, having four edges, a top edge 12, a bottom edge 14, a side edge 16, and a side edge 18. The top and bottom edges 12 and 14, respectively, are generally parallel to each other, and the side edges 16 and 18 are generally parallel to each other.

The fender cover apparatus 10 is made of two layers, which include a top or outside layer 20 and a bottom or inside layer 22. The outside layer 20 is preferably of a relatively "hard" and impervious material, such as vinyl, and the bottom layer 22 is preferably of a softer, non-abrasive material, such as a tight weave, rip stop nylon fabric material. However, as will be discussed below, other materials may also be used. The top or outer layer 20 is made of material which is relatively impervious to liquids of all common types liable to be in the environment of a garage or other location where automotive maintenance and repair work is being conducted. Liquids such as gasoline, oil, water, and the like, will not penetrate a layer of quality vinyl. The vinyl is also relatively impervious to grease and to solvents typically used in automotive repair environments. The vinyl even provides a protective barrier against battery acid. Obviously, steps should be taken to clean the cover from spills of liquids, particularly battery acid, as rapidly as possible.

The bottom or lower layer 22 is preferably made of nylon, and more particularly of a tight weave rip stop nylon fabric. The nylon provides a relatively soft and nonabrasive, yet protective, layer, for disposal against the exterior finish of a vehicle. With the two layers, the outside vinyl layer 20 and the bottom or inside nylon layer 22, the fender, such as the fender 4 of the vehicle 2, is relatively well protected against scratches, dents, etc. The two layers together provide protection for the finish of the vehicle 2 against the inadvertent dropping of tools, etc., and the rubbing of buttons, zippers, etc., which may be on the clothing worn by a mechanic working on the vehicle.

The use of a tightly woven material such as nylon provides a non-abrasive flexible surface for the cover and which is disposed directly on the vehicle. The tight weave prevents the entrapment of potential abrasive elements which could scratch or otherwise damage the vehicle.

The two layers 20 and 22 are preferably bonded only at the outside edges, as by an edge or border binding 24. The binding 24 is preferably sewn or stitched to the two layers 20 and 22. Under some circumstances it may be preferable, from the protective point of view, to allow the top and bottom layers 20 and 22 to move relative to each other. Thus, some slippage is allowed or provided for with the two layers 20 and 22 being secured together only at their outer peripheries.

For securing the fender cover apparatus to a surface to be protected, such as the metal fenders or sides of a vehicle, a plurality of flexible magnetic elements is used. The flexible magnetic elements include four magnetic strips 30, 32, 34, and 36 which are aligned in a row parallel to and spaced apart from the top edge 12. This is shown in FIGS. 1 and 2.

In addition to the single top row of magnetic elements 30, 32, 34, 36, there are preferably two other bottom or lower magnetic elements, including a magnetic element 40 and a magnetic element 42, disposed parallel to the bottom edge 14, and adjacent to the side edges 16 and 18, respectively. As best shown in FIG. 1, the relatively wide spacing of the magnetic elements 40 and 42 allows the fender cover apparatus 10 to be placed on a fender and to avoid having a magnetic element disposed over the wheel well, or in the area of the wheel well. Rather, as is shown in FIG. 1, the magnetic elements 40 and 42 are on the fender 4 adjacent to the wheel well area so that a positive magnetic engagement between the magnetic elements 40 and 42 and the metal of the fender 4 takes place. However, if desired, the lower magnets 40 and 42 may be omitted.

The magnetic elements 30, 32, 34, 36, 40, and 42 are, as indicated above, flexible magnetic elements. They thus conform to the curvature of the vehicle on which they are disposed, as required. Obviously, the extent of the flexibility of the magnetic elements is somewhat limited, but the freedom of movement of the flexible magnetic elements does allow for the fender cover apparatus 10 to be disposed on virtually any type of ferrous metal fender cover and to provide adherence thereto. If the fender cover apparatus 10 is disposed on a plastic or fiberglass fender, or on other than a ferrous metal type fender, obviously the magnetic properties of the magnetic elements will not aid in the adherence of the fender cover apparatus 10 to the vehicle, although the top magnetic elements may still be used to hold metallic objects, such as tools, to the cover.

For securing the magnetic elements to the cover apparatus 10, the magnetic elements are disposed between the outer layer 20 and the inner or bottom layer 22. The magnetic elements are preferably stitched to the outer layer 20 through the opposite ends of each magnetic strip. The stitching may go through both the upper layer 20 and the lower layer 22, but the stitching preferably extends only through the upper layer 20. This is best shown in FIGS. 4 and 5. By stitching only through the upper or outer layer 20, as shown in FIG. 5, the bottom or lower layer 22 remains clear and free from any unnecessary protrusion, etc., that may trap particulates that could scratch the surface of a vehicle.

In FIGS. 2, 4, and 5, there is shown stitching 50 extending across the opposite ends of the magnetic elements. The magnetic elements are thus secured to the apparatus 10 only near their outer ends. With the stitching 50 extending only through the outer layer 20, the outer layer 20 and the inner layer 22 of the cover apparatus 10 remains substantially free from each other except at their outer peripheral edges. The strength of the magnets 30 . . . 36, or any of them, and the magnets 40 and 42 may vary. For convenience in holding metallic objects, such as screws, tools, etc., to the top of the cover 10, one or more of the magnets 30 . . . 36, or any of them, may be stronger than the magnets 40 and 42. This may require that the thickness of some or all of the magnets 30 . . . 36 be greater than the thickness of the magnets 40 and 42, or that the width be greater, etc. Indeed the composition of the magnets may be different from each other.

The top magnets or magnetic elements 30 and 36, in order to hold or to help hold tools on the top of the cover 10, must be strong enough to exert their magnetic force both downwardly through the bottom layer 22 and upwardly through the top layer 20. The bottom magnetic elements 40 and 42 need only exert their magnetic force through the bottom layer 22. Hence the need for greater magnetic strength for the top magnetic elements 30 . . . 32.

If desired, only one or more of the magnets 30 . . . 36 may be used for securing metallic objects, such as tools, screws, clamps etc., to the cover 10. The other magnetic elements in the top row accordingly need not have the extra strength required of the double holding magnetic elements.

As discussed above, the border 24 extends about the outer periphery of the cover 10, which is at the four edges 12, 14, 16, and 18 of the cover 10. However, as may be understood from FIG. 2, if it is desired that the stitching 50 extend through the magnetic strips and through both the upper or outer layer 20 and the lower layer 22, then the two layers are secured together at locations inwardly from their outer peripheral edges, but still relatively close to the peripheral edges. This may be best understood from FIG. 2. Since the magnetic elements are disposed adjacent to the peripheral edges of the two layers, stitching through the magnets and through both the upper and lower layers is still confined to the outer periphery of the cover 10. The center portion of the fender cover apparatus 10, which is by far the largest area of the cover apparatus 10, is still free from attachment and thus the layers 20 and 22 are able to move relative to each other over the largest portion or area of the cover apparatus.

FIG. 6 is a fragmentary view in partial section of an alternate embodiment of the apparatus of the present invention. Fender cover apparatus 110 includes an outer, impermeable layer 120 and a lower or bottom layer 122. The layers 120 and 122 are substantially the same as the layers 20 and 22 of the fender cover apparatus 10, namely a generally impermeable outer layer and a non-abrasive inner or bottom layer.

As an alternative to the stitching 50, there is shown in FIG. 6 part of the cover 110 in which an adhesive layer 160 is used between a flexible magnet or magnetic element 130 and the upper or top layer 120. The adhesive 160 is preferably used to secure the magnet 130 only to the top layer 120, thus leaving the top layer 12 and the bottom layer 122 as separate entities. If desired of course, the magnetic elements, such as the magnetic element 130, may be adhesively secured to both the top and the bottom layers.

The layers 120 and 122 are preferably secured together only at the outer peripheral edges by any of several appropriate fastening elements, such as stitching through an edge binding or border similar to the binding or border 24 of the cover apparatus 10. However, under some circumstances it may be advantageous to be able to separate the upper or outer layer 120 from the bottom or lower layer 122, and thus separable fasteners may be used instead of stitching.

At the outer edge of the fender cover 110, as shown in FIG. 6, there is shown the outer, peripheral edges of the fender cover apparatus 110, in which the upper, generally impermeable layer 120, which is preferably made of vinyl, or the like, as discussed above, and the lower, bottom layer 122 are secured together by separable fastening elements 170, such as "Velcro" fasteners. The employment of separable edge fasteners, such as "Velcro" fastening material, or snaps or the like, allows the upper and lower layers to be separated. With the upper and lower layers separated, the lower layer 122 may be removed for cleaning. Thus, when the lower layer 122, which is disposed against the fender of a vehicle, become dirty, the upper and lower layers are simply separated, and the lower layer is appropriately cleaned, as by laundering, etc.

With the flexible magnetic elements, such as the elements 42 or 130 secured only to the top, generally impermeable layer, the lower layer may be removed for cleaning without interfering with the magnetic strips, providing a separable connector is used.

As shown in FIGS. 2 and 3, an edge binding 24 is used, along with stitches, to substantially permanently fasten the upper, outer layer to the lower, bottom layer of the fender cover apparatus 10. However, using separable fastening elements, such as the "Velcro" fastening material 170 of FIG. 6, or other appropriate separable fastening elements, the two layers may be separated, as desired.

When separable fastening elements are used to secure the two layers together, under some circumstances it may be advantageous to use a softer material for the lower layer than rip stop nylon. For example, a relatively soft material, such as flannel, fleece-type material, natural or artificial, or the like, may be desirable. However, though such material may be softer than nylon, at the same time the material is far more likely to pick up and hold dust, dirt, and other foreign material. Accordingly, the soft bottom layer must be periodically removed and cleaned to insure that damage is not done to the finish of the vehicle on which the cover apparatus is disposed and with which it is used. In addition, with relatively thick material, such as natural or artificial fleece or fleece-like material, the strength of the magnetic element may need to be increased over that required for thinner materials.

With the use of an adhesive 60, the stitching 50 is obviated, and thus both the upper layer 20 and the lower layer 22 provide smooth, uninterrupted, surfaces. Obviously, the adhesive 60 is flexible, so that it may move with the magnetic strips and with the upper and lower layers 120, 122 of the apparatus 110 to conform to the curvature, etc., of the vehicle where the apparatus 110 is used. Moreover, and in both cases where either stitching or an adhesive is used, the flexibility of both the magnets and a particular securing element used to fasten the magnets to the top layer, and to the bottom layer, if desired, allows the fender cover apparatus to be folded for convenient storage.

It will be noted that the magnetic strips or elements are discontinuous, or are spaced apart, to insure that the covers 10 and 110 may be folded for storage without damaging the magnetic elements. Although the magnetic strips or elements are flexible, there is a practical radius of curvature for them, and exceeding that radius of curvature, i.e., increasing the degree or amount of bending in too short a radius, may result in fracturing or breaking the magnetic elements.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What we claim is:

1. A protective cover article, comprising, in combination:
   a first outer layer of flexible material having an outer periphery and being substantially impervious to liquid contaminants typically found in an automotive environment;
   a second inner layer of relatively soft flexible material having an outer periphery and adapted to be disposed against a surface to be protected;
   means for securing the first and second layers together at their outer peripheries whereby the first and second layers remain free from each other except at their outer peripheries; and
   flexible magnetic means disposed between the first and second layers for magnetically securing the cover to a metallic surface and for magnetically securing metallic objects to the cover.

2. The article of claim 1 in which the flexible magnetic means comprises a plurality of magnetic elements spaced apart from each other.

3. The article of claim 2 in which the magnetic means includes a first row of flexible magnetic elements and a second row of flexible magnetic elements.

4. The article of claim 3 in which the first row of magnetic elements includes a first plurality of spaced apart magnetic elements and the second row of magnetic elements includes a second plurality of spaced apart magnetic elements remote from the first row of magnetic elements.

5. The article of claim 4 in which the outer peripheries of the first and second layers include a first edge and a second edge spaced apart from the first edge and the first row of magnetic elements is disposed adjacent to the first edge and the second row of magnetic elements is disposed adjacent to the second edge.

6. The article of claim 5 in which the outer peripheries of the first and second layers further include a third edge and a fourth edge, and the second row of magnetic elements includes a firs magnetic element disposed adjacent to the third edge and a second magnetic element disposed adjacent to the fourth edge.

7. The article of claim 2 in which the plurality of magnetic elements are secured only to the first outer layer.

8. The article of claim 7 in which the plurality of magnetic elements are secured to the first outer layer by stitching.

9. The article of claim 7 in which the plurality of magnetic elements are adhesively secured to the first outer layer.

10. The article of claim 1 in which the first and second layers include a first top edge, a second bottom edge generally parallel to the first top edge, a third side edge, and a fourth side edge generally parallel to the third side edge.

11. The article of claim 10 in which the flexible magnetic means includes a first row of spaced apart magnetic elements disposed adjacent to the first top edge and extending from adjacent to the first side edge to adjacent to the second side edge.

12. The article of claim 11 in which the flexible magnetic means further includes a first magnetic element disposed adjacent to the third side edge and to the second bottom edge, and second magnetic element disposed adjacent to the fourth side edge and to the second bottom edge.

13. The article of claim 12 in which the first and second magnetic elements comprise a second row of spaced apart magnetic elements.

14. The article of claim 10 in which the flexible magnetic means includes a first plurality of magnetic elements disposed generally parallel to the first top edge.

15. The article of claim 14 in which the first plurality of magnetic elements is disposed adjacent to the first top edge.

16. The article of claim 15 in which the flexible magnetic means includes a second plurality of magnetic elements disposed adjacent to the second bottom edge.

17. The article of claim 16 in which the second plurality of magnets includes one magnetic element disposed adjacent to the first side edge and another magnetic element disposed adjacent to the second side edge.

18. The article of claim 1 in which the means for securing the first and second layers together includes stitching.

19. The article of claim 1 in which the means for securing the first and second layers together includes separable fastening means for separating the first layer from the second layer.

20. The article of claim 1 in which the flexible magnetic means include first magnetic elements for magnetically securing the cover to a metallic surface and for securing metallic objects to the cover, and second magnetic elements for magnetically securing the cover to the metallic surface.

* * * * *